(12) United States Patent
Chen et al.

(10) Patent No.: US 12,286,084 B2
(45) Date of Patent: Apr. 29, 2025

(54) CAR DOOR INNER HANDLE MOUNT REPAIR METHOD AND STRUCTURE

(71) Applicant: HUSHAN AUTOPARTS INC., New Taipei (TW)

(72) Inventors: Ying-Chih Chen, New Taipei (TW); Ching-Chiang Tsai, Taipei (TW); Chang-Sheng Su, Keelung (TW)

(73) Assignee: HUSHAN AUTOPARTS INC., New Taipei (TW)

( * ) Notice: Subject to any disclaimer, the term of this patent is extended or adjusted under 35 U.S.C. 154(b) by 0 days.

(21) Appl. No.: 18/380,682

(22) Filed: Oct. 17, 2023

(65) Prior Publication Data

US 2025/0074366 A1    Mar. 6, 2025

(30) Foreign Application Priority Data

Aug. 28, 2023   (TW) .................................. 112132394

(51) Int. Cl.
*B60S 5/00*   (2006.01)
*E05B 79/06*   (2014.01)
*E05B 85/12*   (2014.01)

(52) U.S. Cl.
CPC ................ *B60S 5/00* (2013.01); *E05B 79/06* (2013.01); *E05B 85/12* (2013.01)

(58) Field of Classification Search
CPC . B60S 5/00; E05B 79/06; E05B 85/12; Y10T 29/49718; Y10T 29/49721; Y10T 29/4973; Y10T 29/49723; Y10T 29/49728

USPC ............. 29/402.01, 402.03, 402.08, 402.09, 29/402.13

See application file for complete search history.

(56) References Cited

U.S. PATENT DOCUMENTS

| | | | |
|---|---|---|---|
| 9,126,291 B1* | 9/2015 | Thrasher | B23P 6/00 |
| 10,661,754 B2* | 5/2020 | Gerdes | E05B 81/78 |
| 12,065,861 B2* | 8/2024 | Araki | E05B 85/10 |
| 2008/0211258 A1* | 9/2008 | Jenks | B60J 5/0434 |
| | | | 296/146.6 |

* cited by examiner

*Primary Examiner* — Sarang Afzali
*Assistant Examiner* — Darrell C Ford

(57) ABSTRACT

A Car Door Inner Handle Base Repair Method is a technique used to repair the fracture and separation of the welding post between the car door inner handle base and the inner door panel body without the need to replace the entire car door inner panel assembly. This method involves creating an identical repair component by copying the car door inner handle base. The repair component includes multiple corresponding through-posts, aligned with the welding posts of the damaged inner door panel body and the damaged car door inner handle base. To execute the repair, the damaged inner door panel body is drilled with holes corresponding to the through-posts, and the repair component's multiple through-posts are inserted into the corresponding holes on the damaged inner door panel, securing the repair component in place using locking mechanisms.

2 Claims, 4 Drawing Sheets

CAR DOOR INNER HANDLE MOUNT REPAIR METHOD AND STRUCTURE

TECHNICAL FIELD

A method and structure for repairing the car door inner handle mount, in particular to a method for repairing the inner handle mount of a welded car door without replacing a whole brand-new car door inner panel assembly in a case of when the inner handle mount of the inner door is fracture and separated from the inner door panel, so that the damaged inner door panel can be used to reduce waste, reduce material use and be friendly to the environment.

BACKGROUND

In some commercial car models, the car door inner handle mount and the inner door panel are made of plastic materials, and they are welded with the inner door panel through the joint post on the inner handle mount. However, due to long-term use and the influence of external factors, this kind of welded connection is prone to fracture, which leads to the failure of normal operation of the door inner handle or even complete fall off. Nevertheless, the original factory usually only provides the whole assembly as a replacement part, and its price is quite expensive, which makes the maintenance cost rise sharply.

This situation is a trouble for car owners, because they may only need to repair the broken car door inner handle mount, instead of having to replace the entire car door inner panel assembly. However, due to the limitation of the original factory, car owners can only choose to buy the whole assembly when the car door inner handle mount is broken, which undoubtedly increases their maintenance burden.

In addition, although the quality of the whole assembly provided by the original factory is guaranteed, for some older or rare models, this after-sales service may not be provided in time, or even the corresponding replacement parts cannot be obtained at all, which will make the owner fall into a more embarrassing situation.

In a word, the problem of broken car door inner handle mounts does exist in some commercially available cars, and the original factory only provides after-sales service for the whole assembly, which may bring inconvenience and high maintenance costs to the owners. Therefore, the present invention aims to provide a method for repairing the car door inner handle mount of the car owners, which is relatively affordable without replacing the whole car door inner panel assembly, and can better meet the needs of the car owners, so as to maintain the normal operation of the car and reduce the maintenance cost, and can achieve the purposes of reducing waste, reducing the use of materials and being friendly to the environment.

SUMMARY

In order to solve the above problems, the present invention relates to a method for reinforcing and repairing a car door inner handle mount, which is used to repair the fracture and separation of the welding post between the inner handle mount and the inner panel body of the car door without replacing the whole car door inner panel assembly, and includes the following steps: step S1, removing step: removing a damaged inner handle mount from a damaged inner door panel body; step S2, a measuring step: precisely measuring the three-dimensional shape data of the car door inner handle mount; step S3, a manufacturing step: manufacturing an identical remanufactured part according to a copy of the car door inner handle mount, wherein the remanufactured part is provided with a car door inner handle mount body and a plurality of through-posts completely corresponding to the welding posts; step S4, a drilling step: drilling holes corresponding to the through-posts at the welded joint between the damaged inner door panel body and the damaged car door inner handle mount; step S5: an assembling step: passing the plurality of through-posts of the remanufactured part through the corresponding holes in the damaged inner door panel, and fixing the remanufactured part on the damaged inner door panel through snap fasteners.

The present invention relates to a structure fir reinforcing and repairing a car door inner handle mount, which is used for repairing a damaged inner door panel body, wherein the welding post between the damaged inner door panel body and the car door inner handle mount has been fractured and separated, characterized in that the structure including a damaged inner door panel body, a welded joint where the damaged inner door panel body is welded with welding posts of a car door inner handle mount is provided with a through-hole, and a remanufactured part, wherein one side of the remanufactured part is provided with a car door inner handle mount body, and the other side is provided with a plurality of through-posts completely corresponding to the welding posts, wherein the remanufactured part passes through the through-holes through the through-posts and is fixed on the damaged inner door panel with a plurality of snap fasteners.

The main technical means of this invention is that the length of the through-post of the remanufactured part is longer than the welding post of the original car door inner handle mount, the old damaged door panel is used for assembling, holes are drilled in the fractured part of the old damaged door panel corresponding to the welding post, and then the through-posts of the remanufactured part are allowed to pass through the old damaged door panel and then are fixed.

In this way, the repairing method and structure with the lowest manufacturing cost can be obtained, and the whole car door inner panel assembly does not need to be replaced, thus achieving the advantages of simplified structure, reduced material use, friendliness to environment, easy manufacture and rapid mass production.

DESCRIPTION OF EMBODIMENTS

Figure 1:
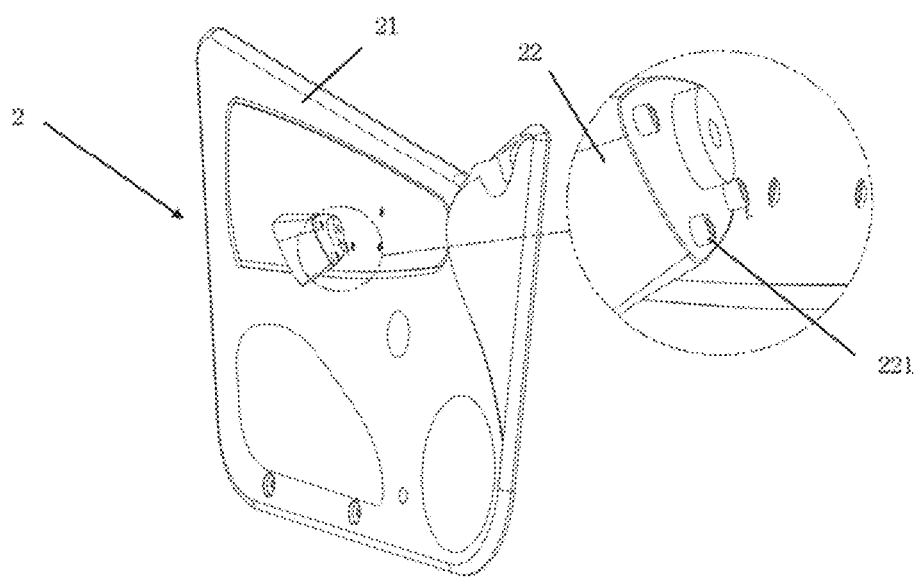
FIG. 1 is a conventional diagram of the present invention.

Please refer to FIG. 1, which is a conventional drawing of the present invention, which reveals a damaged car door inner panel assembly 2, which includes a damaged inner door panel body 21 and a car door inner handle mount 22. A welding post 221 of the damaged car door inner handle mount 22 has been fractured and separated from the damaged inner door panel body 21. Generally, the car door inner panel assembly 2 is made of a plastic material, because plastic has the characteristics of light weight, durability and easy molding and manufacturing. The plastic material of the door trim panel can be treated by different surface treatments, such as painting, leather covering, gluing cloth, etc., to increase its appearance texture and comfort. In addition, the door trim panel may also be equipped with decorative elements made of other materials, such as metal or rubber, to increase the style and richness of the car. On the whole, plastic is the main material for the manufacture of the car door interior panels, which helps to provide lightweight and durable interior design.

Figure 2:
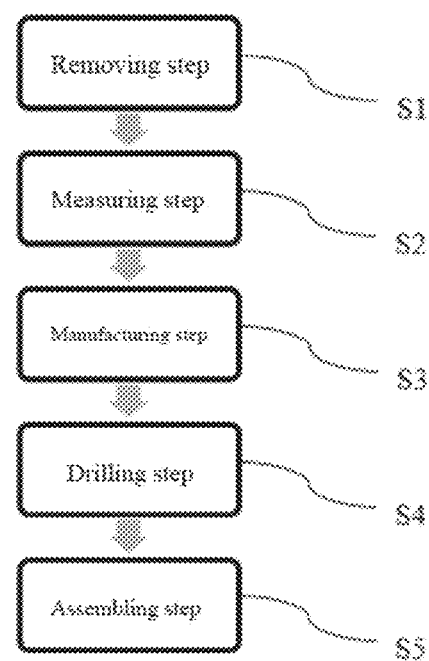
FIG. 2 is a step diagram of the method of the present invention.
Figure 3:
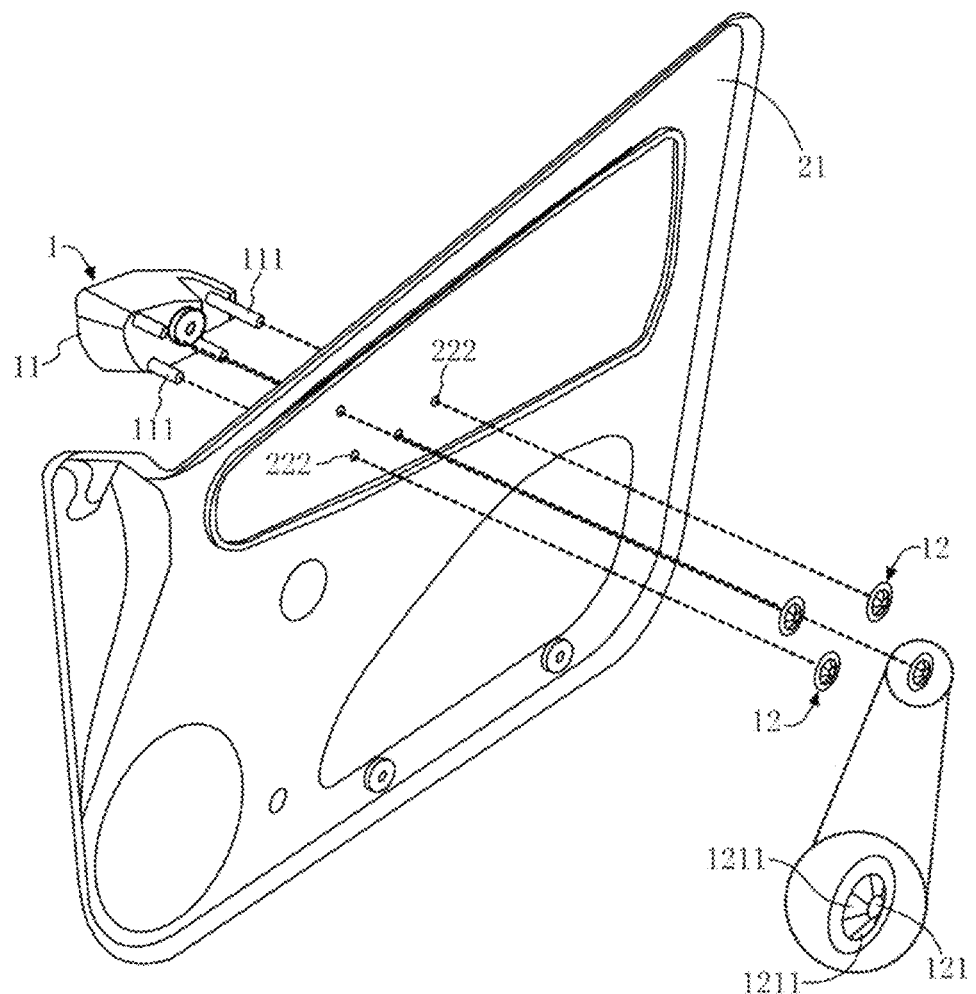
FIG. 3 is an exploded view of the present invention.
Figure 4:
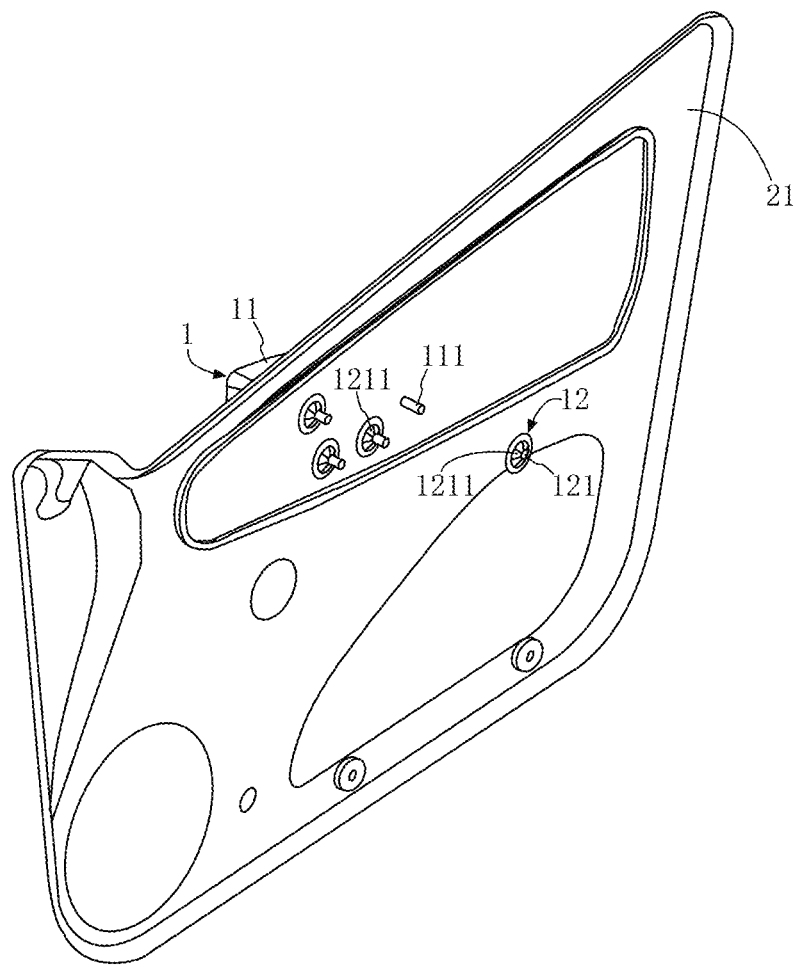
FIG. 4 is an assembly diagram of the present invention.

Next, please refer to FIG. 2 and FIG. 3. FIG. 2 is a step diagram of the method of the present invention, and FIG. 3 is an exploded view of the present invention. FIG. 2 discloses a method for reinforcing and repairing a door inner handle mount 22, which is a method for repairing the fracture and separation of a welded joint between welding posts 221 of an car door inner handle mount 22 and an inner door panel body 21 without replacing a whole inner door panel assembly 2, and includes the following steps: step S1, removing step: removing a damaged inner handle mount 22 from the damaged inner door panel body 21; step S2, a measuring step: precisely measuring the three-dimensional shape data of the car door inner handle mount 22; step S3, a manufacturing step: manufacturing an identical remanufactured part 1 according to a copy of the car door inner handle mount 22, wherein the remanufactured part 1 is provided with a car door inner handle mount body 11 and a plurality of through-posts 111 completely corresponding to the welding posts 221; step S4 in FIG. 3, a drilling step: drilling through-holes 222 corresponding to the through-posts 111 at the welded joint between the damaged inner door panel body 21 and the damaged car door inner handle mount 22; finally, please refer to FIG. 2 and FIG. 4 at the same time. FIG. 4 is an assembly diagram of the present invention; step S5 in FIG. 4: an assembling step: passing the plurality of through-posts 111 of the remanufactured part 1 through the corresponding through-holes 222 in the damaged inner door panel body 21 and fixing the remanufactured part 1 on the damaged inner door panel body 21 through snap fasteners 12. In addition, there is another assembling step S5: first, there is a gluing procedure, in which the snap fasteners 12, the through-holes 222 and the through-posts 111 are coated with screw glue, and then assembled, which can increase the firmness.

In addition, the plurality of snap fasteners 12 can be unidirectional fasteners, and the snap fasteners 12 are disc-shaped, and the center of the snap fastener 12 is provided with a fastening hole 121, on which at least one fastening tooth 1211 is provided in a protruding manner. In other words, at least one snap portion is formed on a disc-shaped body of the snap fastener 12. In one embodiment, the snap fasteners 12 can be made of metal, the hardness of which is greater than that of the plastic material of the through-posts 111, so that the remanufactured part 1 can be prevented from loosening by biting the through-posts 111 by the at least one fastening tooth 1211.

Through the present invention, it is no longer necessary to waste the damaged inner door panel body 21. Usually, when the car door inner handle mount is broken, the rest of the car door inner panel assembly 2 is still intact. If it is discarded, it will be a large volume of plastic waste. Therefore, the present invention can reduce the pollution to the environment, reduce the manufacturing cost, and reduce the maintenance cost for the owner. It is not necessary to replace the whole car door inner panel assembly 2, and it can also contribute to the sustainable development of the earth.

What is claimed is:

1. A structure, wherein a car door inner panel assembly (2) includes an inner door panel body (21), a car door inner handle mount (22) and a plurality of welding posts (221) connected between the inner door panel body (21) and the car door inner handle mount (22), and the structure is used for, in case of at least one of the plurality of welding posts (221) having been fractured so as to be separated from the inner door panel body (21) and/or the car door inner handle mount (22), replacing the car door inner handle mount (22) so as to be in combination with the inner door panel body (21), and comprising:
   a plurality of through-holes (222), being formed on the inner door panel body (21);
   a remanufactured part (1), comprising a duplicate (11) of the car door inner handle mount (22), and the duplicate (11) having a plurality of through-posts (111); and
   a plurality of snap fasteners (12), wherein each of the plurality of snap fasteners (12) is a unidirectional fastener including a disc-shaped body, and the disc-shaped body is provided with a fastening hole (121) at a center thereof;
   wherein a plurality of snap portions (1211), surrounding the fastening hole (121), are formed on the disc-shaped body of the snap fastener (12);
   wherein the remanufactured part (1) is configured such that when the remanufactured part (1) is positioned such that the plurality of through-posts (111) pass through the plurality of through-holes (222), correspondingly, the duplicate (11) is in contact with the inner door panel body (21);
   wherein each of the plurality of snap fasteners (12) is configured such that when each of the plurality of snap fasteners (12) is positioned such that the fastening hole (121) thereof is passed through by the corresponding through-post (111), the through-post (111) is locked by the plurality of snap portions (1211).

2. The structure according to claim 1, wherein, the plurality of snap fasteners is made of metal.

* * * * *